United States Patent
Nanba et al.

(10) Patent No.: US 7,974,074 B2
(45) Date of Patent: Jul. 5, 2011

(54) ELECTRIC DOUBLE-LAYERED CAPACITOR

(75) Inventors: Youichi Nanba, Tokyo (JP); Takashi Mori, Tokyo (JP)

(73) Assignee: Showa Denko K.K., Tokyo (JP)

( * ) Notice: Subject to any disclaimer, the term of this patent is extended or adjusted under 35 U.S.C. 154(b) by 505 days.

(21) Appl. No.: 12/066,782

(22) PCT Filed: Apr. 24, 2007

(86) PCT No.: PCT/JP2007/058808
§ 371 (c)(1),
(2), (4) Date: Mar. 13, 2008

(87) PCT Pub. No.: WO2007/125896
PCT Pub. Date: Nov. 8, 2007

(65) Prior Publication Data
US 2009/0135547 A1    May 28, 2009

(30) Foreign Application Priority Data

Apr. 25, 2006   (JP) .................................. 2006-121113
Apr. 25, 2006   (JP) .................................. 2006-121114

(51) Int. Cl.
*H01G 9/00*   (2006.01)
(52) U.S. Cl. ........................................................ 361/502
(58) Field of Classification Search .................. 361/502, 361/503
See application file for complete search history.

(56) References Cited

U.S. PATENT DOCUMENTS

| | | | |
|---|---|---|---|
| 6,072,693 A * | 6/2000 | Tsushima et al. | 361/502 |
| 6,353,528 B1 * | 3/2002 | Hori et al. | 361/502 |
| 6,865,068 B1 | 3/2005 | Murakami et al. | |
| 2002/0096661 A1 | 7/2002 | Shinozaki et al. | |
| 2004/0106042 A1 * | 6/2004 | Asari et al. | 429/232 |

FOREIGN PATENT DOCUMENTS

| | | |
|---|---|---|
| CN | 1482692 | 3/2004 |
| JP | 62200715 A | 9/1987 |
| JP | 163065 U | 4/1989 |
| JP | 6176971 A | 6/1994 |
| JP | 6330016 A | 11/1994 |
| JP | 8298232 A | 11/1996 |
| JP | 10256087 A | 9/1998 |
| JP | 2001015390 A | 1/2001 |
| JP | 200189119 A | 4/2001 |
| JP | 2001284188 A | 10/2001 |
| JP | 200414989 A | 1/2004 |
| JP | 2005347100 A | 12/2005 |
| WO | WO 2004043859 A2 * | 5/2004 |

* cited by examiner

*Primary Examiner* — Eric Thomas
(74) *Attorney, Agent, or Firm* — Sughrue Mion, PLLC

(57) ABSTRACT

The invention relates to a coin-type electric double-layered capacitor, including activated carbon electrode layers, an electrolytic solution, and a separator between a metal-made top vessel and a metal-made bottom vessel, and obtained by caulking and sealing the top vessel and the bottom vessel with a gasket and a sealing agent, wherein the edges of the top and bottom vessels overlap each other by 0.1 to 0.5 mm. Preferably, the injection amount of the electrolytic solution is in a range of 0.1 to 10% of the void volume in the electrode.

16 Claims, 4 Drawing Sheets

[Fig. 1]
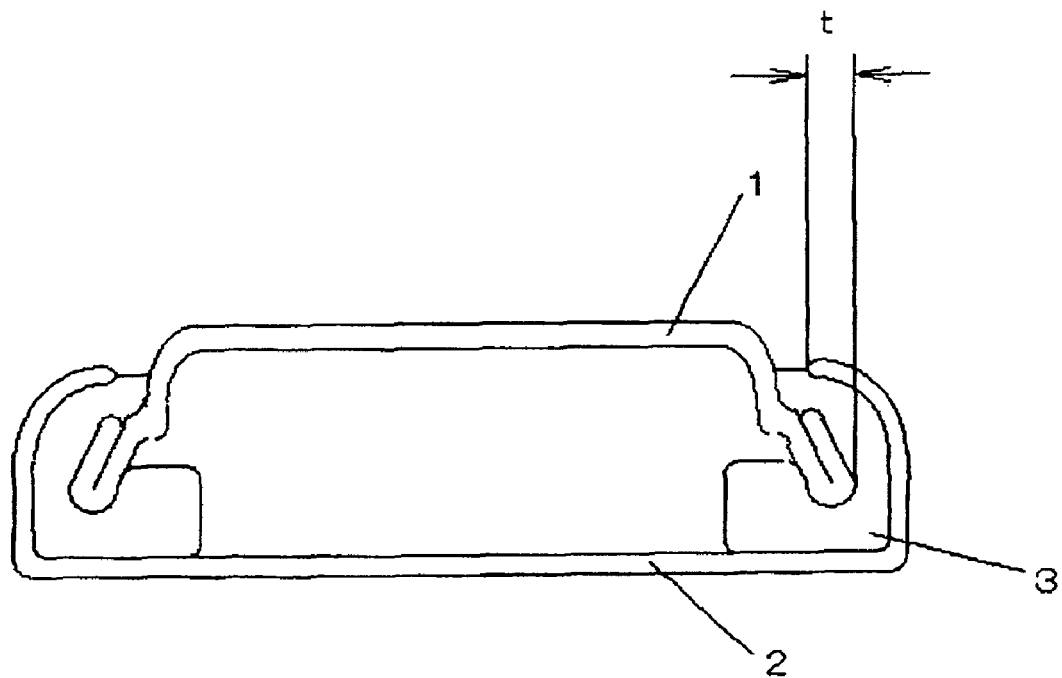
[Fig. 2]
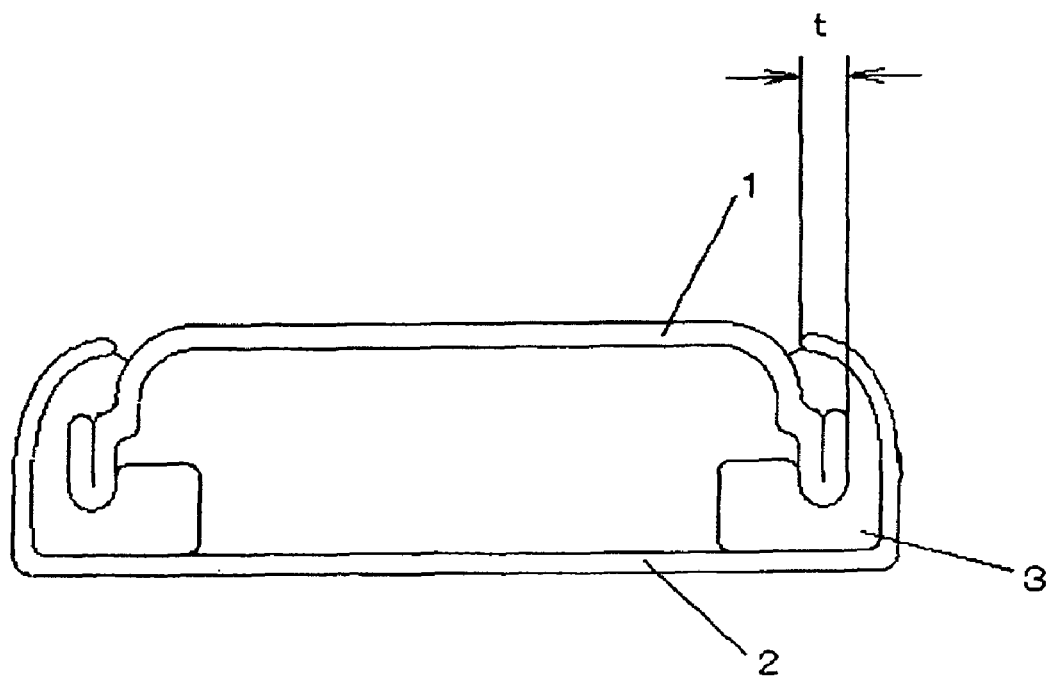

[Fig. 3]
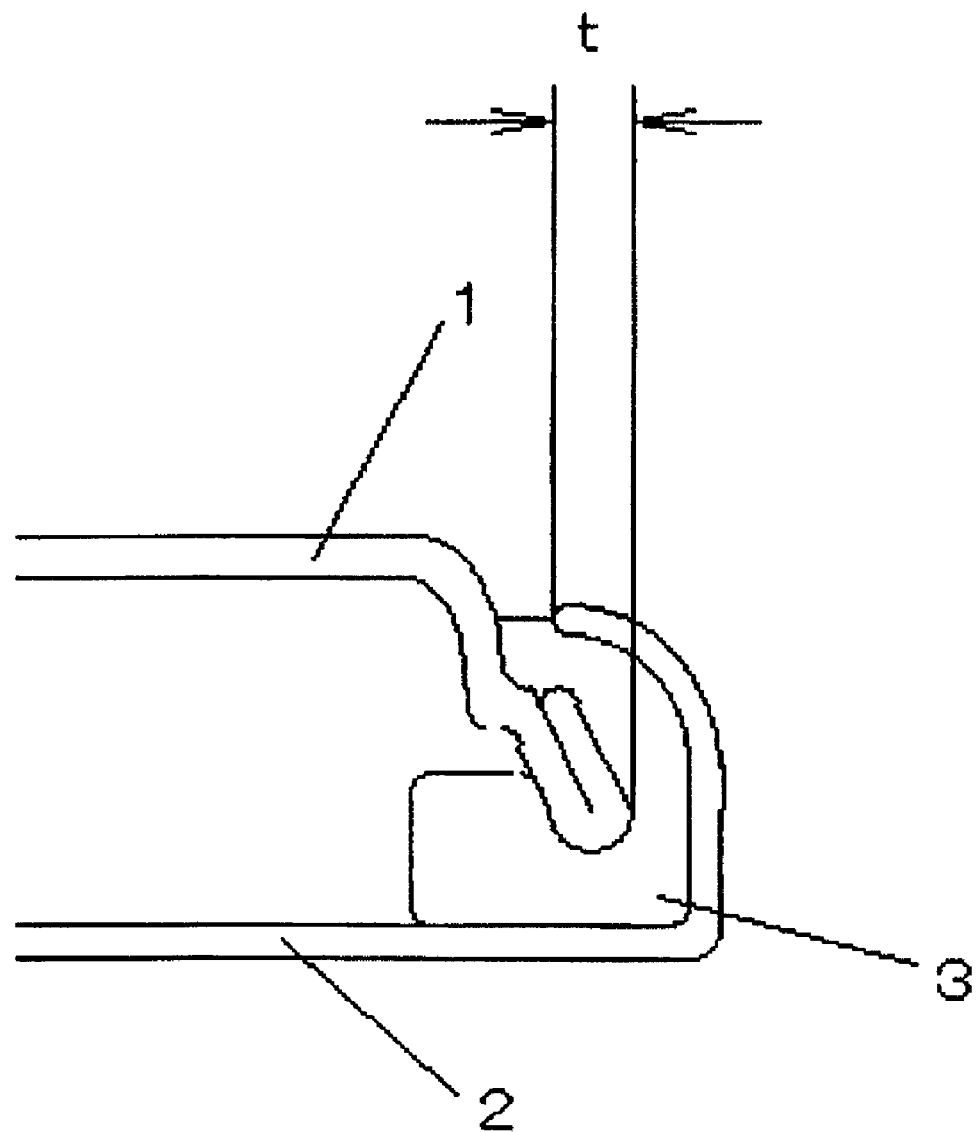

[Fig. 4]
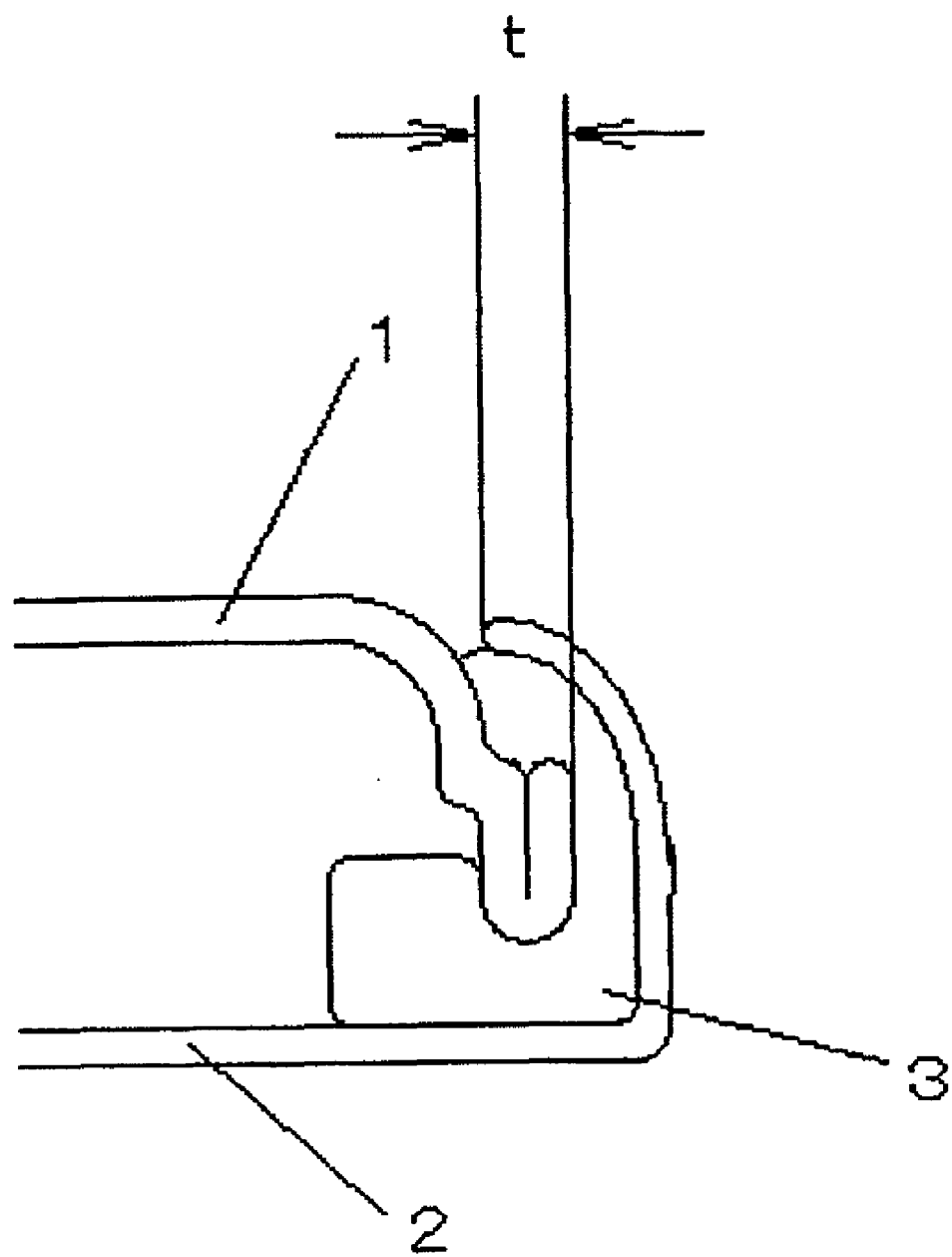

[Fig. 5]
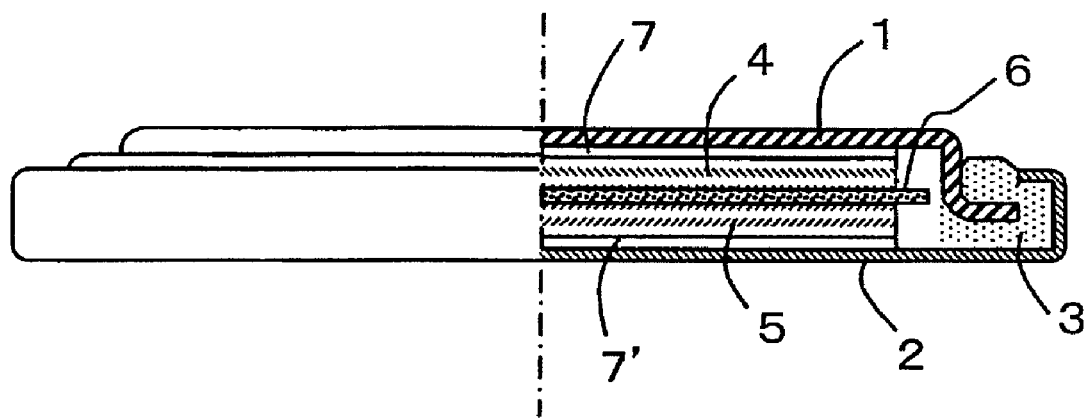

ELECTRIC DOUBLE-LAYERED CAPACITOR

TECHNICAL FIELD

The present invention relates to an electric double-layered capacitor (also referred to as electric double-layered condenser). Specifically, the present invention relates to a coin-type electric double-layered capacitor.

BACKGROUND ART

An electric double-layered capacitor uses electric energy supplied from an electric double layer formed at an interface between a pair of electrodes as a cathode or an anode made of an activated carbon and an electrolyte. A small coin-type electric double-layered capacitor is characterized by high energy density, lightweight, and little environmental burden. There are rapidly increasing demands for electric double-layered capacitors as a memory backup power source for portable apparatus such as a mobile phone or a digital camera. In particular, the electric double-layered capacitor is widely employed in a memory backup of a digital GSM mobile phone which is widely used in Europe, Asia, Africa, or Middle and Near East in view of environmental responsiveness.

In addition, it is desired that a lithium secondary battery to be used in a high functionally mobile phone be replaced by an environmentally friendly electric double-layered capacitor formed of carbon and a metal container only.

The electric double-layered capacitor, which does not include a chemical reaction in its charge-discharge mechanism, can be charged or discharged at a large electric current, as compared with a lithium ion battery. However, reduction in internal resistance of the electric double-layered capacitor has been desired in order to further improve charge-discharge characteristics of the capacitor.

In addition, a solder reflow method involving heating solder in a reflow furnace at a high temperature of about 250 to 260° C. to melt solder has been recently employed as a method of connecting the electric double-layered capacitor to a substrate.

Various attempts including improvement of a material for a separator or a gasket have been made as means for solving a problem due to the reflow heat to thereby improve heat resistance of the capacitor.

Patent Document 1: JP 6-176971 A
Patent Document 2: JP 8-298232 A
Patent Document 3: JP 2004-14989 A
Patent Document 4: JP 2005-347100 A

DISCLOSURE OF THE INVENTION

The first object of the present invention is to provide an electric double-layered capacitor which does not cause, for example, deformation of a capacitor element under high temperature of a reflow furnace, and is excellent in charge-discharge characteristics and cycle characteristics.

The second object of the present invention is to provide an electric double-layered capacitor which has a low internal resistance, is excellent in charge-discharge characteristics and cycle characteristics, and does not cause, for example, deformation of a capacitor element under high temperature of a reflow furnace.

In order to solve the above-mentioned problems, the present invention provides an electric double-layered capacitor having any one of the following constitutions, and a portable apparatus using the capacitor.

1. A coin-type electric double-layered capacitor, including activated carbon electrode layers, an electrolytic solution, and a separator between a top vessel (1) and a bottom vessel (2), and obtained by caulking and sealing the top vessel (1) and the bottom vessel (2) with a gasket (3) and a sealing agent, wherein the edges of the top vessel (1) and of the bottom vessel (2) after the caulking overlap each other by 0.1 to 0.5 mm.
2. The coin-type electric double-layered capacitor according to 1, in which a conductive adhesive layer is present between the top vessel (1) or the bottom vessel (2) and each of the activated carbon electrode layers, and the conductive adhesive layer contains a compound having ion permeability, and carbon fine particles.
3. The electric double-layered capacitor according to 1 or 2, in which the content of the electrolytic solution with respect to an electrode pore volume is 0.1 to 10%.
4. The electrical double-layered capacitor according to any one of 1 to 3, in which the gasket (3) is at least one kind of resin selected from a polyphenylene sulfide resin, a polyether ketone resin, a polyether etherketone resin, a polyethylene terephthalate resin, a polyarylate resin, a polybutylene terephthalate resin, a polycyclohexane dimethylene terephthalate resin, a polyether sulfone resin, a polyamino bismaleimide resin, a polyamideimide resin, a polyether imide resin, and a polyamide 46 resin.
5. The electric double-layered capacitor according to any one of 1 to 4, in which the sealing agent contains a polymer having one of a linear polyisobutylene structure and a linear perfluoropolyether structure as a main chain in its molecules, and further contains a hindered phenol-based antioxidant.
6. The electric double-layered capacitor according to any one of 1 to 5, wherein the activated carbon electrode layers each contain activated carbon having a peak A showing the maximum pore volume value of a pore size range of 1 to 1.5 nm in a pore size distribution, within the range of 0.012 to 0.05 cm$^3$/g, the value accounting for 2 to 32% of the total pore volume.
7. The electric double-layered capacitor according to any one of 1 to 6, in which the separator is formed of a non-woven fabric, cellulosic paper, a glass fiber, a fluororesin, or polypropylene, and has a thickness of 0.02 to 0.1 mm.
8. A coin-type electric double-layered capacitor, including activated carbon electrode layers, an electrolytic solution, and a separator in a metal can, and obtained by sealing the metal can, wherein a conductive adhesive layer is present between the metal can and each of the activated carbon electrode layers, and the conductive adhesive layer contains a compound having ion permeability and carbon fine particles.
9. The coin-type electric double-layered capacitor according to 8, in which the edges of a top vessel (1) of the metal can and of a bottom vessel (2) of the metal overlap each other by 0.1 to 0.5 mm after caulking and sealing the top vessel (1) and the bottom vessel (2).
10. The coin-type electric double-layered capacitor according to 8 or 9, in which the decomposition starting temperature of the compound having ion permeability is 260° C. or higher.
11. The coin-type electric double-layered capacitor according to any one of 8 to 10, in which the compound having ion permeability is a compound obtained by crosslinking polysaccharide polymers, and the carbon fine particles are needle-like or rod-like carbon fine particles.
12. The coin-type electric double-layered capacitor according to any one of 8 to 11, in which the compound having ion permeability is a compound obtained by crosslinking polysaccharide polymers with one or more kinds selected from the group consisting of acrylamide, acrylonitrile, a chitosan pyrrolidone carboxylate, and hydroxypropylchitosan.

13. The coin-type electric double-layered capacitor according to any one of 8 to 12, in which the compound having ion permeability has a fluorine ion conductivity of $1 \times 10^{-2}$ S/cm or more.
14. The coin-type electric double-layered capacitor according to any one of 1 to 13, in which the activated carbon electrode layers each contain polyethylene terephthalate (PTFE) having an average particle size of 400 to 600 µm.
15. The coin-type electric double-layered capacitor according to any one of 1 to 14, in which the activated carbon electrode layers each contain one or more kinds selected from the group consisting of carboxymethylcellulose, polyvinylidene fluoride, and polyvinyl acetamide.
16. The coin-type electric double-layered capacitor according to any one of 8 to 15, in which the activated carbon electrode layers each contain activated carbon having a peak A showing the maximum pore volume of a pore size range of 1 to 1.5 nm in a pore size distribution, within the range of 0.012 to 0.05 cm$^3$/g, the value accounting for 2 to 32% of the total pore volume.
17. A portable apparatus using the coin-type electric double-layered capacitor according to any one of 1 to 16.

According to the present invention, there can be provided an electric double-layered capacitor excellent in reflow characteristic, charge-discharge characteristics and cycle characteristics.

According to the present invention, there can be provided an electric double-layered capacitor which: has a low internal resistance; and is excellent in charge-discharge characteristics, cycle characteristics and reflow characteristic.

BRIEF DESCRIPTION OF THE DRAWINGS

FIG. 1 is an example showing overlap of a top vessel and bottom vessel in a coin-type electric double-layered capacitor.
FIG. 2 is an example showing overlap of a top vessel and bottom vessel in a coin-type electric double-layered capacitor.
FIG. 3 is an example of an enlarged view showing overlap of the top vessel and bottom vessel in a coin-type electric double-layered capacitor.
FIG. 4 is an example of an enlarged view showing overlap of the top vessel and bottom vessel in a coin-type electric double-layered capacitor.
FIG. 5 is an example of a sectional view of an electric double-layered capacitor.

DESCRIPTION OF SYMBOLS

1: top vessel
2: bottom vessel
3: gasket
4,5: activated carbon electrode layer
6: separator
7,7': conductive adhesive layer

BEST MODE FOR CARRYING OUT THE INVENTION

Hereinafter, the present invention will be described in detail.

An electric double-layered capacitor in a first preferred embodiment of the present invention includes activated carbon electrode layers each formed by using activated carbon, conductive adhesive layers, an electrolytic solution containing a non-aqueous solvent and an electrolyte, and a separator inside, and is obtained by caulking and sealing a top vessel (1) and a bottom vessel (2) with a gasket (3) and a sealing agent, in which overlapping of the edges of the top vessel (1) and of the bottom vessel (2) by 0.1 to 0.5 mm can be observed in cross section structure by transmission X-ray analysis after the caulking of the top vessel (1) and the bottom vessel (2).

FIGS. 1 and 2 are each an outline view showing an example of the overlap of the top vessel (1) and bottom vessel (2) in a coin-type electric double-layered capacitor. FIG. 3 is an enlarged partial view of FIG. 1, and FIG. 4 is an enlarged partial view of FIG. 2. Here, the overlap between the edges of the top vessel (1) and of the bottom vessel (2) is represented by t in FIGS. 1 to 4. It is preferred that the overlap t be within a range of 0.1 to 0.5 mm, more preferably 0.1 to 0.4 mm, or still more preferably 0.3 to 0.4 mm. When the overlap t is less than 0.1 mm, liquid leakage may be caused at the time of solder reflow. It is difficult to make the overlap t larger than 0.5 mm in consideration for the design of a coin cell.

In a preferred embodiment of the coin-type electric double-layered capacitor of the present invention, the content of the electrolytic solution with respect to the electrode pore volume of the electric double-layered capacitor is 0.1 to 10%, preferably 0.1 to 6%, more preferably 0.2 to 3%.

The term "electrode pore volume of the coin-type electric double-layered capacitor" as used herein refers to the volume of pores in an electrode sheet itself, and includes not only the pore volume of activated carbon but also voids between activated carbon particles. The electrode pore volume can be calculated from a total pore volume calculated from, for example, the nitrogen adsorption quantity of the electrode sheet itself. When the amount of the electrolytic solution is larger than 10%, inner pressure of the capacitor tends to increase abruptly owing to an increase in vapor pressure of the electrolytic solution at the time of solder reflow. When the amount of the electrolytic solution is smaller than 0.1%, characteristics of the electric double-layered capacitor such as cycle characteristics may deteriorate.

The electrolytic solution used in the electric double-layered capacitor of the present invention includes non-aqueous solvent and an electrolyte.

Known electrolytes may be used for the electrolyte. Preferred examples of electrolyte used here include at least one salt selected from the group consisting of quarternary ammonium salts or quarternary phosphonium salts comprising a quarternary onium cation represented by $R^1R^2R^3R^4N^+$ or $R^1R^2R^3R^4P^+$ ($R^1$, $R^2$, $R^3$ and $R^4$ are respectively alkyl group or allyl group having 1 to 10 of carbon atoms) and anion such as $BF_4^-$, $PF_6^-$ or $ClO_4^-$; lithium hexafluorophosphate (LiPF$_6$), lithium hexafluoroborate (LiBF$_6$), lithium hexafluoroarsenate (LiAsF$_6$) and lithium trifluoromethane sulfonate (CF$_3$SO$_3$Li).

Specific examples of the electrolyte (also referred to as supporting electrolyte) include one or more salts such as (C$_2$H$_5$)$_4$PBF$_4$, (C$_3$H$_7$)$_4$PBF$_4$, (CH$_3$)(C$_2$H$_5$)$_3$NBF$_4$, (C$_2$H$_5$)$_4$NBF$_4$, (C$_2$H$_5$)$_4$PPF$_6$, (C$_2$H$_5$)$_4$PCF$_3$SO$_4$, (C$_2$H$_5$)$_4$NPF$_6$, lithium perchlorate (LiClO$_4$), lithium hexafluorophosphate (LiPF$_6$), lithium hexafluoroborate (LiBF$_4$), lithium hexafluoroarsenate (LiAsF$_6$), trifluoromethane lithium sulfonate (LiCF$_3$SO$_3$), bistrifluoromethyl sulfonil imide lithium (LiN(CF$_3$SO$_2$)$_2$], thiocyanate, and aluminum fluoride.

As the non-aqueous solvent, any known non-aqueous solvent solvents such as cyclic esters, acyclic esters, cyclic ethers, and chain ethers or the like can be used. Preferred examples thereof include cyclic carbonates and chain carbonates. Specific examples include non-aqueous solvent such as propylene carbonate (PC), ethylene carbonate (EC), butylene carbonate (BC), vinylene carbonate, dimethyl carbonate (DMC), diethyl carbonate (DEC), γ-butyrolactone (γBL), 2-methyl-γ-butyrolactone, acetyl-γ-butyrolactone, γ-valerolactone, 1,2-dimethoxyethane (DME), 1,2-ethoxyethane, diethyl ether, ethyleneglycol dialkyl ether, diethyleneglycol dialkyl ether, triethyleneglycol dialkyl ether, tetraethyleneglycol dialkyl ether, dipropyl carbonate, methyl ethyl carbonate, methyl butyl carbonate, methyl propyl carbonate, ethyl butyl carbonate, ethyl propyl carbonate, butyl propyl carbonate, alkyl propionate, dialkyl malonate, alkyl acetate, tetrahydrofuran (THF), alkyl tetrahydrofuran, dialkylalkyl tetrahydrofuran, alkoxy tetrahydrofuran, dialkoxy tetrahydrofuran, 1,3-dioxolane, alkyl-1,3-dioxolane, 1,4-dioxolane, 2-methyl tetrahydrofuran, dimethyl sulfoxide, 1,3-dioxolane, formamide, dimethyl formamide, dioxolane, acetonitrile, nitro methane, methyl formate, methyl acetate, methyl propionate, ethyl propionate, triphosphate, maleic anhydride, sulfolane, 3-methyl sulfolane and derivatives or mixture thereof. Particularly preferred are ethylene carbonate, propylene carbonate, dimethyl carbonate, diethyl carbonate, methylethyl carbonate, acetonitrile, sulfolane, and methylsulfolane.

Of those, anon-aqueous solvent having a boiling point of 200° C. or higher at normal pressure is preferably used. For example, at least one kind of a solvent selected from the group consisting of propylene carbonate (PC), ethylene carbonate (EC), and γ-butyrolactone (γBL), or a mixed solvent containing an acyclic carbonate and a cyclic carbonate, and sulfolane or a derivative of sulfolane is suitably used.

Examples of impurities present in the non-aqueous solvent include water and organic peroxides (such as glycols, alcohols, and carboxylic acids). The impurities seems to form an insulating membrane on a surface of an electrode to thereby increase interfacial resistance of the electrode, which likely leads not only to shortening a cyclic life or to a decrease in capacitance but also to an increase in self-discharge when stored at high temperature (60° C. or more). Therefore, the more impurities are removed from the electrolytic solution including non-aqueous solvent, the more preferable. Specifically, it is preferred that water content be preferably 50 ppm or less, and that organic peroxide be 1,000 ppm or less.

The sealing agent used for the electric double-layered capacitor in the preferred embodiment of the present invention contains a polymer having one of a linear polyisobutylene structure and a linear perfluoropolyether structure as a main chain in its molecules from the viewpoints of heat resistance, chemical resistance, and ease of handling. A ratio of rubber in composition of a sealing agent in the preferred embodiment of the present invention is 1 to 10% by mass, or preferably 2 to 5% by mass, against a sealing agent liquid substance. When the concentration of the rubber is higher than 10% by mass, the viscosity of the composition increases, with the result that uniform coating property is reduced. When the concentration of the rubber is less than 1% by mass, the coating film formed of the sealing agent becomes unsatisfactory. In addition, preferred examples of organic liquid substance to be used in the sealing agent composition of the present invention include a hydrocarbon compound, an oxygen-containing organic compound, or a chlorine-containing organic compound. A specific example is a hydrocarbon solution having 6 to 12 carbon atoms, and, in particular, aromatic hydrocarbon-based solvents such as benzene, toluene, and xylene are preferred. Further, additives such as a heat stabilizer as required can be added to the sealing agent composition in the present invention. As a heat stabilizer added, those which does not react with the electrolytic solution and is insoluble in the electrolytic solution are preferred, and examples thereof include a hindered phenol-based antioxidant. The addition amount of such antioxidant or the like is typically 0.1 to 20% by mass, or preferably 0.5 to 10% by mass with respect to the rubber. When the addition amount of the heat stabilizer exceeds 20% by mass, the flexibility of the sealing agent decreases, which may cause cracking of the rubber. When the addition amount of the heat stabilizer is less than 0.1% by mass, the heat resistance of the sealing agent becomes insufficient. For example, a TB 1170B or TB1171 manufactured by ThreeBond Co., Ltd. can be used as the sealing agent in the present invention.

Preferably used as the material of the gasket (3) of the electrical double-layered capacitor in a preferred embodiment of the present invention is at least one kind of resin selected from a polyphenylene sulfide resin, a polyether ketone resin, a polyether etherketone resin, a polyethyleneterephthalate resin, a polyarylate resin, a polybutylene terephthalate resin, a polycyclohexane dimethylene terephthalate resin, a polyether sulfone resin, a polyamino bismaleimide resin, a polyamideimide resin, a polyether imide resin, and a polyamide 46 resin. For example, a polyphenylene sulfide resin and polyether ketone resin can be used.

As the separator of the electric double-layered capacitor in a preferred embodiment of the present invention, although glass fiber can be used most stably, resin having a thermodistortion point of 230° C. or more, such as polyphenylene sulfide, polyethyleneterephtalate, polyamide, polyimide, polypropylene, and cellulose may be employed. The separator pore size is not particularly limited and is usually 0.01 to 10 μm. The thickness of the separator is not particularly limited and is usually 20 to 150 μm.

The activated carbon electrode layers in the preferred embodiment of the present invention each contain activated carbon having an average particle size in the range of 2 to 15 μm, a fluorine-containing polymer compound as a binder, and an electric conductivity aid (such as carbon black).

Here, the electrode density of the activated carbon electrode layer is preferably 0.55 to 0.8 g/cm$^3$. With an electrode density within this range, contact area between an electrode and an electrolytic solution can be increased, which contributes to better permeability and impregnation of the electrolytic solution.

The activated carbon electrode layer is preferably 20Ω or less in impedance at 1 kHz in frequency. Lower impedance enables charging and discharging with a larger electric current, and charge-discharge capacity becomes larger.

The activated carbon in a preferred embodiment of the present invention has a peak A value showing the maximum pore volume of a range of 1 to 1.5 nm of pore size within the range of 0.012 to 0.05 cm$^3$/g, which maximum value accounts for 2 to 32% to the total pore volume.

The pore size distribution of the activated carbon can be calculated by BJH method from $N_2$-adsorption isotherm. Specifically, activated carbon is cooled down to 77.4° K (boiling point of nitrogen), nitrogen gas is introduced, and adsorption quantity of nitrogen-gas V [cc/g] is measured by volume method. The measurement values are plotted with the horizontal axis representing relative ratio ($P/P_o$) of pressure of nitrogen gas P [mnmHg] (adsorption equilibrium pressure) and saturated vapor pressure of nitrogen gas $P_o$ [mmHg], and the vertical axis representing adsorption quantity of nitrogen gas V [cc/g] under the condition of adsorption equilibrium to obtain an $N_2$-adsorption isothermal line. The pore size distribution analysis is carried out by BJH (Barrett-joyner-Halenda) method from the $N_2$-adsorption isotherm. The BJH method, which is well known in the art, for instance, may be carried out by the method as described in J. Amer. Chem. Soc. 73. 373. (1951).

The activated carbon in a preferred embodiment of the present invention has peak A value showing the maximum pore volume within the range of 1 to 1.5 nm of pore diameter, preferably 1.2 to 1.4 nm. The peak A value is within a range of 0.012 to 0.05 $cm^3/g$, preferably 0.02 to 0.05 $cm^3/g$. When the peak A is within the above range of an pore diameter, the internal resistance of the electrode layer hardly increases even if the electrode layer is thick. The preferable activated carbon used in the present invention has a peak B of the pore volume within the range of 1.5 to 1.7 nm of a pore diameter, a peak C of the pore volume within the range of 1.7 to 2 nm, and a peak D of the pore volume within the range of 2 to 2.5 nm.

In the activated carbon in a preferred embodiment of the present invention, it is preferred that the peak A value which is within the range of 1 to 1.5 nm account for 2 to 32% of the total pore volume, preferably 20 to 31%. The peak A value covering such a range does not allow the internal resistance to easily increase even though the electrode layer is thick.

The activated carbon in a preferred embodiment of the present invention has a BET specific surface area of preferably 700 to 2,200 $m^2/g$, especially preferably 1,000 to 2,100 $m^2/g$. If the BET specific surface area is too large, the electrode density of an electrode sheet in an electric double-layered capacitor is decreased, which tends to result in an decrease in an electric capacity per volume and a failure in obtaining a desired capacity. On the other hand, if the BET specific surface area is too small, an electric capacity per mass of activated carbon tends to decrease.

A producing method of the activated carbon in a preferred embodiment of the present invention includes:

process (A) comprising steps of carbonizing a low-softening point pitch in the presence of a compound containing 7,000 ppm or more in metallic element concentration of an element of any one of Groups 2 to 5 in the $4^{th}$ period or Group 4 elements in the $5^{th}$ period in the periodic table to thereby obtain a graphitizable carbonaceous substance having a true density of 1.44 to 1.52 $g/cm^3$, activating the graphitizable carbonaceous substance in the presence of alkali metallic compound, and then washing the activated carbonaceous substance; and process (B) comprising steps of carbonizing a low-softening-point pitch to obtain a graphitizable carbonaceous substance having a true density of 1.44 to 1.52 $g/cm^3$, mixing the graphitizable carbonaceous substance with a compound containing 7,000 ppm or more in metallic element concentration of an element of any one of Groups 2 to 5 in the $4^{th}$ period or Group 4 elements in the $5^{th}$ period in the periodic table, to thereby obtain a mixture, activating the mixture in the presence of alkali metallic compound, and then washing the activated mixture.

The pitch to be used in the method of producing activated carbon in the preferred embodiment of the present invention is low-softening-point pitch. Examples of pitch include petroleum-based pitch and coal-based pitch. Of those, in particular, soluble part of the coal-based pitch in an organic solvent is preferably used in the present invention. The softening point of the low-softening-point pitch to be used in the present invention, which is not particularly limited, is preferably 100° C. or lower, or more preferably 60 to 90° C.

The akaline earth metallic compound used in the producing method of activated carbon in a preferred embodiment of the present invention is not particularly limited as long as the compound is a simple substance or compound containing at least one alkaline earth metallic element selected from the group consisting of beryllium, magnesium, calcium, strontium, barium, and radium. Any of such inorganic compound and organic compound may be used.

Examples of inorganic compounds of alkaline earth metal include oxides, hydroxides, chlorides, bromide, iodide, fluoride, phosphate, carbonate, sulfide, sulfate, and nitrate.

Examples of organic compounds of alkaline earth metal include organometallic complexes having acetylacetone and cyclopentadien.

Alkaline earth metallic compounds preferably used in the present invention include oxide, carbonate or sulfide containing at least one alkaline earth metallic element selected from beryllium, magnesium, calcium, strontium, barium and radium, more specifically are magnesium oxide, calcium oxide, calcium carbonate, calcium sulfide, strontium fluoride, or magnesium phosphate.

One kind of the alkaline earth metallic compounds can be used alone, or two or more kinds of them can be used in combination. A method of activating each of the compounds is not particularly limited, and a known method such as gas activation (water vapor, $CO_2$, or the like), chemical activation (zinc chloride, phosphoric acid, calcium carbonate, or the like), or alkali metal activation (potassium hydroxide, sodium hydroxide, or the like) can be adopted; an alkali metal activation method is preferably adopted from the viewpoint of an increase in volume of the compound.

In a preferred embodiment of the present invention, compounding the vapor grown carbon fiber into the activated carbon electrode layer can further improve the property. The manner for compounding the vapor grown carbon fiber in the activated carbon is not particularly limited. It is preferable that the vapor grown carbon fiber and the graphitizable carbonaceous substance be mixed and activated to obtain the carbon composite powder including the vapor grown carbon fiber and the activated carbon. This manner decreases a contact resistance between the particles, increases an electric conductivity and a mechanical strength of the electrode, and lowers the expansion rate of the electrode at the time of applying voltage. Also, the carbon composite powder may be prepared by simply mixing the vapor grown carbon fiber with the activated carbon. The carbon composite powder has larger thermal conductivity than the activated carbon alone has.

The vapor grown carbon fiber to be compounded with the activated carbon is not particularly limited and, for example, the vapor grown carbon fiber having a hollow structure therein, a specific surface area of 10 to 50 $m^2/g$, an average fiber diameter of 50 to 500 nm, and an aspect ratio of 5 to 1,000 may be used. Any vapor grown carbon fiber such as a branched carbon fiber, a linear carbon fiber or mixture thereof may be employed.

The preferable fiber length of the vapor grown carbon fiber is in a range of 0.5 to 2 times the average diameter of the activated carbon. When vapor grown carbon fiber length is shorter than 0.5 times the average diameter of the activated carbon, crosslinking between the particles cannot be achieved, which likely results in insufficient electric conductivity. When carbon fiber length is longer than 2 times the average diameter of the activated carbon, the vapor grown carbon fiber cannot be present between the activated carbon particles, which may result in a decrease in strength of polarizable electrode.

Vapor grown carbon fiber, which has a concentric orientation structure, may be preliminarily subjected to activation treatment such as gas activation (water vapor, carbon dioxide and so on), chemical activation (zinc chloride, phosphoric acid, calcium carbonate and so on), alkaline activation (potassium hydroxide, sodium hydroxide, and so on) before used in the invention. In this situation, it is preferred that the surface structure of the carbon fiber be controlled to have a micro pore (having a pore size of 2 nm or less) volume of 0.01 to 0.4 cm$^3$/g and BET specific surface area of 10 to 500 m$^2$/g. If the micro pore volume is too large, ion diffusion resistance in the electrode may unfavorably rise.

The amount of the vapor grown carbon fiber is preferably 0.02 to 20% by mass, more preferably 0.1 to 20% by mass, particularly preferably 0.5 to 10% by mass, based on the activated carbon. If the amount of the vapor grown carbon fiber is less than 0.02% by mass, the effect of increasing thermal conductivity of carbon composite powder mixed with graphitizable carbonaceous substance becomes little, resulting in insufficient thermal uniformity at the time of activation to thereby make uniform activation difficult, which leads to a failure in production of an activated carbon excellent in quality stability, having a large electrostatic capacitance per volume (F/cm$^3$) on industrial scale. If the amount of the carbon fiber exceeds 20% by mass, density of electrode decreases, which may lower an electric capacitance per volume (F/cm$^3$).

Use of vapor grown carbon fiber in combination with massive activated carbon particles not only improves heat radiation property with good thermal and electric conductivity of vapor grown carbon fiber but also reinforces effectively suppresses increase in expansion rate of electrode at the time of applying voltage thanks to existence of the fibrous substance reinforcing the function as cushion material.

The carbon black used in the activated carbon electrode layer may be carbon material known as conductivity aid for an electrode of an electrochemical device. Examples include acetylene black, channel black and furnace black. The amount of the carbon black is usually 0.1 to 20 parts by mass, preferably 0.5 to 10 parts by mass, based on 100 parts by mass of the electrode layer.

The activated carbon electrode layer may be usually produced by kneading and rolling a compound including the activated carbon, having a conductivity aid and a binder added thereto, by coating a slurry including the activated carbon, a conductive assistant, binder and optionally solvent, onto a collector, or by sintering a mixture including the activated carbon and an un-carbonized resin.

Examples of organic solvent used here include: hydrocarbons such as toluene, xylene, and benzene; ketones such as acetone, methyl ethyl ketone, and butyl methyl ketone; alcohols such as methanol, ethanol, and butanol; and esters such as ethyl acetate and butyl acetate. When an organic solvent having a boiling point higher than 200° C. is used, the organic solvent tends to remain in the sheet upon drying at 100 to 200° C. after the formation of the sheet. Accordingly, an organic solvent having a boiling point of 200° C. or lower is preferably used, and toluene, acetone, ethanol, or the like is suitable.

The sheet is punched out into a predetermined shape to obtain an electrode layer. Then a metallic plate as a collector is laminated onto the electrode layer. Two electrode layers are piled sandwiching a separator, with the metallic plates being outer layers, and then by immersing the stacked body in electrolytic solution, an electric double-layered capacitor is produced.

In a preferred embodiment of the present invention, each of the conductive adhesive layers of the electric double-layered capacitor is disposed between a top vessel or a bottom vessel (or collector), and each of the electrode layers to adhere the electrode layer with the top vessel or the bottom vessel physically and electrically. The conductive adhesive layers each at least include a conductive particle and a binder adherable with the conductive particle as ingredients. On the collector, application liquid for undercoat layer containing the conductive particle, binder and solvent can be applied to form a conductive adhesive layer.

The conductive adhesive layers, which are not particularly limited, each preferably contain carbon black as conductive particles, and synthetic rubber or acrylic as a binder. In a case where the conductive adhesive layers are each present between the top vessel (1) or the bottom vessel (2) and each of the activated carbon electrode layers, and the conductive adhesive layers each contain a compound having ion permeability and carbon fine particles, not only an electric double-layered capacitor excellent in reflow characteristic, charge-discharge characteristics, and cycle characteristics but also a coin-type electric double-layered capacitor having a low internal resistance can be provided, which is particularly preferred.

The conductive particle is not particularly limited as long as the particle has enough electron conductivity to promote charge-transfer between the collector and the electrode layer. For instance, particle including carbon material having electron conductivity is mentioned. Examples of the carbon material include carbon black and graphite, in view of the electronic conductivity. The carbon material particle is preferably a carbon fine particle and in view of the electron conductivity, preferably has a lattice plane distance ($d_{002}$) of 0.335 to 0.338 nm and preferably a crystal pile thickness ($Lc_{002}$) of 50 to 80 nm, as measured by x-ray diffraction.

Examples of the carbon black include acetylene black, ketjen black, channel black, furnace black, and thermal black. Of those, acetylene black is preferable. The carbon black is preferably 25 to 50 nm in average particle size, and is preferably 50 m$^2$/g or more, more preferably 50 to 140 m$^2$/g in BET specific surface area. Use of the carbon black can give good electron conductivity to the conductive adhesive layer and decrease the internal resistance.

Examples of the graphite include natural graphite, artificial graphite and expanded graphite. Of those, artificial graphite is preferred. It is preferable that the graphite has an average particle size of 4 to 6 μm and have a BET specific surface area of 10 m$^2$/g or more, more preferably 15 to 30 m$^2$/g. Use of the graphite can give good electron conductivity to the undercoat layer and decrease the internal resistance.

As carbon material, one kind selected from the carbon blacks and graphites may be used alone or two or more kinds may be used in combination.

The binder included in the conductive adhesive layer is not particularly limited as long as it is bindable with the conductive particle. Examples include polytetrafluoroethylene (PTFE), polyvinylidene fluoride (PVDF), polyethylene (PE), and polypropylene (PP), and fluororubber. Of those, fluororubber is preferred.

Examples of fluororubber include a copolymer of vinylidenfluoride-hexafluoropropylene (VDF-HFP), a copolymer of vinylidenfluoride-hexafluoropropylene-tetrafluoroethylene (VDF-HFP-TFE), a copolymer of vinylidenefluoride-pentafluoropropylene (VDF-PFP), a copolymer of vinylidenefluoride-pentafluoropropylene-tetrafluoroethylene (VDF-PFP-TFE), a copolymer of vinylidenfluoride-perfluoromethylvinylether-tetrafluoroethylene (VDF-PFMVE-TFE), a copolymer of vinylidenefluoride-chlorotrifluoroethylene (VDF-CTFE), a copolymer of ethylene-tetrafluoroethylene, and a copolymer of propylene-tetrafluoroethylene. Preferred among those is fluororubber containing a copolymer composed of two monomers selected from the group consisting of VDF, HFP and TFE, and most preferred is a copolymer of VDF-HFP-TFE in view of improving adhesiveness of a collector and an electrode layer, and chemical resistance.

One kind of the binder may be used alone or two or more kinds selected from the above may be used in combination. The compounded amount of the binder, which depends on a specific surface area of the conductive particle or the desired strength of the electrode, is preferably 30 to 80% by mass, more preferably 50 to 70% by mass, in a dry coating film of the conductive adhesive layer (total mass of conductive particle+binder). The higher the binding property of the binder to the conductive particle is, the better the adhesion between the collector and the electrode layer is, even though the compounded amount is small.

The solvent used in application liquid coating the conductive adhesive layer is not particularly limited as long as it can dissolve the binder. General organic solvent can be used. Examples of organic solvent include saturated hydrocarbons such as hexane, aromatic hydrocarbons such as toluene and xylene, alcohols such as methanol, ethanol, propanol, and butanol, ketones such as acetone, methylethylketone (MEK), methylisobuthylketone (MIBK), and diisobuthylketone, esters such as ethyl acetate and butyl acetate, ethers such as tetrahydrofuran, dioxane, and diethyl ether, amides such as N,N-dimethylformamide, N-methylpyrrolidone, and N,N-dimethylacetamide, and halogated hydrocarbons such as ethylene chloride and chlorbenzene. Preferred among those are ketone solvents and amide solvents, which can dissolve a fluororubber. One of the solvent may be used alone or two or more solvents may be used in combination.

The preferred compounded amount of the solvent in the application liquid for the conductive adhesive layer is about 600 to 2,000 parts by mass based on 100 parts as the total amount of the conductive particle and the binder. The amount of the solvent may be determined based on application property and the like.

In preparing the application liquid for the conductive adhesive layer, the conductive particle, the binder, and the solvent are mixed or kneaded first, to obtain a slurry by a conventional method. The mixing or kneading can be carried out by using roll mill, planetary mixer, open kneader, continuous kneader, press kneader and the like.

FIG. 5 shows apart of the internal sectional view of an electric double-layered capacitor in a second preferred embodiment of the present invention. As shown in the figure, the capacitor is a coin-type electric double-layered capacitor including activated carbon electrode layers (4 and 5), an electrolytic solution (not shown), and a separator (6) in a metal can composed of a top vessel (1) and a bottom vessel (2), and obtained by sealing the metal can with a gasket (3). In the coin-type electric double-layered capacitor, conductive adhesive layers (7 and 7') are each present between the metal can and each of the activated carbon electrode layers (4 and 5), and the conductive adhesive layers each contain a compound having ion permeability, and carbon fine particles. A coin-type electric double-layered capacitor in which the edges of the top vessel (1) and of the bottom vessel (2) overlap each other by 0.1 mm to 0.5 mm after caulking of the top vessel (1) and the bottom vessel (2) and sealing the metal can with the gasket (3) and a sealing agent is particularly preferable, in that the capacitor not only has a low internal resistance but also is excellent in reflow characteristic, charge-discharge characteristics and cycle characteristics.

The conductive adhesive layers in the second preferred embodiment of the present invention are each preferably formed of a conductive adhesive agent containing a compound having ion permeability and carbon fine particles.

Any compound having ion permeability may be used in the preferred embodiment of the present invention as long as it serves as a material (including compounds) having a property of allowing ions to pass through.

Suitable examples of such ion permeable compound include polysaccharides and products obtained by crosslinking the polysaccharides. The term "polysaccharide" refers to a polymer compound obtained by polymerizing a large number of monosaccharides (including substituted products and derivatives of the monosaccharides) by glycoside linkage. The polymer compound produces a large number of monosaccharides by hydrolysis. Products each obtained by polymerizing 10 or more monosaccharides are typically referred to as polysaccharides. The polysaccharides may each have a substituent, and examples of such polysaccharides include polysaccharides (amino sugars) each obtained by substituting an alcoholic hydroxyl group by an amino group, polysaccharides each obtained by substituting an alcoholic hydroxyl group by a carboxyl group or an alkyl group, and products obtained by deacetylating polysaccharides. The polysaccharides may be homopolysaccharides or heteropolysaccharides. Specific examples of the polysaccharides include agarose, amylose, amylopectin, araban, arabinan, arabinogalactan, alginic acid, inulin, carageenan, galactan, galactosamine (chondrosamine), glucan, xylan, xyloglucan, carboxyalkylchitin, chitin, glycogen, glucomannan, keratan sulfate, colominic acid, chondroitin sulfate A, chondroitin sulfate B, chondroitin sulfate C, cellulose, dextran, starch, hyaluronic acid, fructan, pectic acid, a pectic substance, heparanic acid, heparin, hemicellulose, pentosan, $\beta$-1,4'-mannan, $\alpha$-1,6'-mannan, lichenan, levan, lenthinan, and chitosan. Of those, chitin and chitosan are preferable. A crosslinked polymer of cellulose and acrylamide, a crosslinked polymer of cellulose and a chitosan pyrrolidone carboxylate, or the like is a suitable crosslinked product. In addition to the foregoing, for example, products obtained by crosslinking chitosan and chitin as polysaccharide polymers with crosslinking agents can be used. Suitable examples of a usable crosslinking agent include: acrylamide; acrylonitrile; a chitosan pyrrolidone carboxylate; hydroxypropylchitosan; and acid anhydrides such as phthalic anhydride, maleic anhydride, trimellitic anhydride, and pyromellitic anhydride. The compound preferably has a large ion conductivity from the viewpoint of the performance of the electric double-layered capacitor. In particular, a compound having a fluorine ion conductivity of $1\times10^{-2}$ S/cm or more as ion conductivity is suitable.

Examples of a material showing the above-mentioned characteristics include products obtained by crosslinking polysaccharide polymers with acrylic additives, and products based on chitosan-based derivatives. That is, the heat resistance of the capacitor can be significantly improved by turning the compound having ion permeability into a crosslinked polymer. In addition, for example, a rubber-based binder or fluorine-based rubber binder, containing a polymer having one of a linear polyisobutylene structure and a linear perfluoropolyether structure as a main chain in its molecules and containing a hindered phenol-based antioxidant, can also be used. In addition, it is preferable that thermal decomposition starting temperature of the compound having ion permeability be 260° C. or higher, in consideration for a solder reflow characteristic. Two or more kinds of those described above may be selected and used as the compound having ion permeability. For example, chitosan crosslinked with pyromellitic anhydride, chitin crosslinked with maleic anhydride, chitosan crosslinked with acrylonitrile, or chitosan crosslinked with trimellitic anhydride is suitable.

The ion permeable compound to be used in the present invention is preferably a compound having no swelling property in an organic solvent. In addition, the ion permeable compound to be used in the present invention is preferably a compound that does not peel in a friction/peel test with an organic solvent. The reason is as follows: a coating film preferably neither swells with nor dissolves in the electrolytic solution of the electric double-layered capacitor, in which an organic solvent is used as the electrolytic solution in some cases. It should be noted that swelling property of the compound is evaluated by immersing a film made of the ion permeable compound in an organic solvent (30° C.) to be used as the electrolytic solution for 60 minutes and judging whether or not the film has swelled. The friction peel test with an organic solvent is performed by: rubbing the surface of the film made of the ion permeable compound with cloth impregnated with the organic solvent to be used as the electrolytic solution 10 times under a load of 100 g weight; and observing whether or not the film has peeled.

Examples of the carbon fine particles in the preferred embodiment of the present invention include carbon fine particles each composed of a carbon material such as carbon black, graphite, or the carbon fiber described above from the viewpoint of electronic conductivity. It is preferred that the carbon fine particles have a lattice plane distance ($d_{002}$) of 0.335 to 0.338 nm and a crystal pile thickness ($Lc_{002}$) of 50 to 80 nm from the viewpoint of electron conductivity as determined by X-ray diffraction.

Use of graphite described above can impart excellent electronic conductivity to each of the conductive adhesive layers, and reduces the internal resistance of the capacitor. The carbon fine particles may be composed of only one kind of carbon black, graphite, and the carbon fiber described above, or may be composed of two or more kinds of them in combination. It is preferable that carbon fine particles having an electrical resistance in a powder form of $1\times10^{-1}$ Ω·cm or less in a 100% powder compact form be used.

The shape of each of the carbon fine particles in the preferred embodiment of the present invention is not a spherical shape but a shape having anisotropy such as a needle-like shape or a rod-like shape. For example, a shape having an aspect ratio of 2 to 10, or preferably 3 to 6 is suitable.

The carbon fine particles in the preferred embodiment of the present invention share electron transfer in the electric double-layered capacitor. Therefore, an area where a collector (or the metal can) and activated carbon contact with each other must be increased because an electron to be supplied from the outside of the capacitor must be caused to reach activated carbon through the collector at the time of the charging of the capacitor. A fine particle having a large surface area per mass is advantageous for the requirement. Moreover, an electric capacity per cell must be secured with as small an amount of carbon fine particles as possible. Therefore, (electron conductive) carbon fine particles each shaped to have anisotropy are suitable.

The compounding ratio of the carbon fine particles, which varies depending on the specific surface area of each of the carbon fine particles and the like, is preferably from 30 to 80% by mass, or particularly preferably 50 to 70% by mass in each of the conductive adhesive layers inform of dry film. An ion permeable compound having a strong property of adhering to the carbon fine particles can improve adhesion between the collector (or the metal can) and each of the activated carbon electrode layers even when the compounded amount is small.

A solvent that can be mixed in the conductive adhesive is not particularly limited, and a general organic solvent or water can be used. Specific examples of the organic solvent include the organic solvents each used in the application for a conductive adhesive layer. One kind of those solvents can be used alone, or two or more kinds of them can be used as a mixture.

The compounded amount of the solvent in the conductive adhesive may be appropriately determined in consideration of application property, viscosity and the like as in the case of determining the compounded amount of the solvent in the application liquid for a conductive adhesive layer. The activated carbon electrode layers in the preferred embodiment of the present invention can each be produced by kneading activated carbon particles, carbon black, and polyethylene terephthalate (PTFE) and press-rolling the kneaded product; polyethylene terephthalate (PTFE) having an average particle size of 400 to 600 μm is preferably kneaded, and, furthermore, one or more kinds selected from the group consisting of carboxymethylcellulose, polyvinylidene fluoride, and polyvinyl acetamide can be added to the materials and be kneaded.

The collector is not particularly limited as long as the collector is a good conductor capable of sufficiently transferring charge to each electrode layer through each conductive adhesive layer, and a known collector to be used in an electrode for a capacitor can be used. Examples of the collector include a metal foil made of aluminum or the like, and examples of the metal foil include an etched metal foil and a press-molded metal foil. Preferred examples of collector include an aluminum etched foil and stainless steel. In the case of a coin-type capacitor, it is preferable that each of a top vessel and a bottom vessel serve as a collector.

In a preferred embodiment of the present invention, it is preferred that the electric double-layered capacitor be assembled in atmosphere of dehumidified air or inert gas. Also, it is preferred that the parts be dried before assembling. As means for drying or dehydration of pellets, sheets or the other parts, conventional means may be used. Specifically, it is preferred that one of hot wind, vacuum, infrared rays, far infrared rays, electron rays and low humidity wind be used alone or two or more of them be used in combination. A preferred temperature range is 80 to 350° C., particularly preferably 100 to 250° C. A preferred water content is 2,000 ppm or less in cell as a whole, and in polarizable electrode and electrolyte respectively, a preferred water content is 50 ppm or less, in view of improving property of charge-discharge cycle.

In a preferred embodiment of the present invention, the electric double-layered capacitor can be applied to various types of power supply system. A power supply system employing the capacitor can be applied to power supply systems for vehicles such as automobiles and trains; for ships; for air crafts; for mobile electronic equipment such as mobile phones, portable digital assistants, and portable electronic calculators; for business machines; for power generation systems such as photovoltaic generation system and wind power generation system; and the like.

EXAMPLES

The following examples and comparative examples are shown to explain the present invention concretely. The present invention is not limited by these examples.

Example 1

Producing of 6.8 mmΦ×1.4 mm Coin-Type Cell

To 83 parts by mass of activated carbon having average particle size of 4 μm (BET specific surface area: 1,510 m²/g, and the peak A value showing the maximum pore volume in the pore size range of 1 nm to 1.5 nm:0.022 cm$^3$/g, which corresponds to 24% of the total pore volume), 6 parts by mass of PTFE (polytetrafluoroethylene) and 11 parts by mass of carbon black were added and kneaded, the resultant was press-rolled at a pressure of 1 ton/cm$^2$ to be formed into a sheet having thickness of 420 μm. Electrode density of the sheet was 0.62 g/cm$^3$. This sheet was punched with a punch into circular sheets each having diameter of 4.0 mmΦ, and each was vacuum-dried at 200° C. around the clock to thereby obtain polarizable electrodes (activated carbon electrode layer). In a glove compartment in which high purity argon was circulated, the polarizable electrodes were adhered to an aluminum-made top vessel and to an aluminum-made bottom vessel respectively by using a conductive adhesive (rubber-based binder: Bunnylite U.C.C, manufactured by NIPPON KOKUEN KOGYO K.K.) and drying at 100° C. for 20 minutes. 5 μl of electrolytic solution (corresponding to 3.9% of the void volume in the electrode) was injected into the electrodes in the top vessel and the bottom vessel and the electrodes were kept under normal pressure for one hour to thereby be impregnated with the electrolytic solution. As the electrolytic solution, an electrolytic solution manufactured by TOMIYAMA PURE CHEMICAL INDUSTRIES. Inc. containing PC (propylene carbonate) as solvent and 1 mol/L of $(CH_3)(C_2H_5)_3NBF_4$ and $(C_2H_5)_4NBF_4$ as electrolyte was used.

The top vessel and the bottom vessel were caulked and sealed, after providing a Fortlon KPS (polyphenylene sulfide) manufactured by KUREHA CORPORATION as a gasket, a TB1171 manufactured by ThreeBond Co., Ltd. as a sealing agent, and a TGP-010A (glass fiber) manufactured by Nippon Sheet Glass Company, Limited as a separator on the electrode and the top vessel was mounted on the resultant. The overlapping portion of the edges of the top vessel and of the bottom vessel after the sealing, the value t, was 0.12 mm.

The temperature profile of a reflow furnace in a reflow test was as follows:

| | |
|---|---|
| preheating (150 to 190° C.) | about 3 minutes |
| heating (195° C. or higher) | about 3 minutes |
| peak temperature (260° C.) | 5 to 10 seconds. |

Charge and discharge operation between 0 V and 2.7 V at 5 mA was carried out by using a charge-discharge measuring system HJ-101SM6 manufactured by HOKUTO DENKO Co. An electrostatic capacitance per mass (F/g), an electrostatic capacity per volume (F/cm$^3$), and internal resistance of activated carbon of both electrodes in an electric double-layered capacitor were determined from a discharge property curve obtained in the 2nd constant current discharge operation.

Moreover, charge-discharge cycle test of 200 cycles was carried out for durability evaluation to be made from a retention rate of the electric capacitance (calculated as quotient of an electric capacitance value after 200 charge-discharge cycles divided by an electric capacitance after 2nd charge-discharge cycle).

Example 2

Production of 4.8 mmΦ×1.4 mm Coin-Type Cell

A sheet produced in the same manner as in Example 1 was punched with a punch into circular sheets each having diameter of 2.4 mmΦ, and each was vacuum-dried at 200° C. around the clock to thereby obtain polarizable electrodes. In a glove compartment in which high purity argon was circulated, the electrode sheets were adhered to an aluminum-made top vessel and an aluminum-made bottom vessel respectively by using a conductive adhesive (rubber-based binder: Bunnylite U.C.C, manufactured by NIPPON KOKUEN KOGYO K.K.) and drying at 100° C. for 20 minutes. 10 μl of electrolytic solution (corresponding to 11.8% of the void volume in the electrode) was injected into the electrode in the top vessel and in the bottom vessel and the electrodes were kept under normal pressure for one hour to thereby be impregnated with the electrolytic solution. As the electrolytic solution, an electrolytic solution manufactured by TOMIYAMA PURE CHEMICAL INDUSTRIES. Inc. containing EC/DEC (ethylene carbonate/diethylene carbonate) as solvent and 1 mol/L of $LiPF_6$ as electrolyte was used.

The top vessel and the bottom vessel were caulked and sealed, after providing a Fortlon KPS (polyphenylene sulfide) manufactured by KUREHA CORPORATION as a gasket, a TB1171 manufactured by ThreeBond Co., Ltd. as a sealing agent, and a TGP-010A (glass fiber) manufactured by Nippon Sheet Glass Company, Limited as a separator on the electrode and the top vessel was mounted on the resultant. The overlapping portion of the edges of the top vessel and of the bottom vessel after the sealing, the value t, was 0.30 mm.

A reflow experiment was conducted in the same manner as in Example 1. Charge and discharge operation between 0 V and 3 V at 5 mA was carried out by using a charge-discharge measuring system HJ-101SM6 manufactured by HOKUTO DENKO Co: An electrostatic capacitance per mass (F/g) and an electrostatic capacitance per volume (F/cm$^3$) of activated carbon of both electrodes in an electric double-layered capacitor were determined from discharge property curve obtained in the 2nd constant current discharge operation.

Moreover, charge-discharge cycle test of 200 cycles was carried out for durability evaluation to be made from a retention rate of the electric capacitance (calculated as quotient of an electric capacitance value after 200 charge-discharge cycles divided by an electric capacitance after 2nd charge-discharge cycle).

Example 3

Production of 3.8 mmφ×1.1 mm Coin-Type Cell

To 80 parts by mass of activated carbon having average particle size of 4 μm (BET specific surface area: 1,510 m$^2$/g, the peak A value showing the maximum pore volume in the range of 1 to 1.5 nm: 0.022 cm$^3$/g, which corresponds to 24% of the total pore volume), 10 parts by mass of PTFE (polytetrafluoroethylene) and 10 parts by mass of carbon black was added and kneaded. The resultant was press-rolled at a pressure of 1 ton/cm$^2$ to be formed into a sheet having thickness of 350 μm. Electrode density of the sheet was 0.62 g/cm$^3$. This sheet was punched with a punch into circular sheets each having diameter of 1.7 mmφ, and was dried at 200° C. around the clock to thereby obtain polarizable electrodes (activated carbon electrode layer). The sheet produced as in same manner as in Example 1 was punched with a punch into circular sheets each having diameter of 1.9 mmφ, and each was vacuum-dried at 200° C. around the clock to thereby obtain polarizable electrodes. In a glove compartment in which high purity argon was circulated, the electrode sheets were adhered to an aluminum-made top vessel and an aluminum-made bottom vessel respectively by using a conductive adhesive (rubber-based binder: Bunnylite U.C.C, manufactured by NIPPON KOKUEN KOGYO K.K.) and drying at 100° C. for 20 minutes. 30 μl of electrolytic solution (corresponding to 5.3% of the void volume in the electrode) was injected into the electrode in the top vessel and in the bottom vessel and the electrodes were kept under normal pressure for one hour to thereby be impregnated with the electrolytic solution. As the electrolytic solution, an electrolytic solution manufactured by TOMIYAMA PURE CHEMICAL INDUSTRIES. Inc. containing EC/DEC (ethylene carbonate/diethylene carbonate) as solvent and 1 mol/L of $LiPF_6$ as electrolyte was used.

The top vessel and the bottom vessel were caulked and sealed, after providing a Fortlon KPS (polyphenylene sulfide) manufactured by KUREHA CORPORATION as a gasket, a TB1171 manufactured by ThreeBond Co., Ltd. as a sealing agent, and a TGP-010A (glass fiber) manufactured by Nippon Sheet Glass Company, Limited as a separator on the electrode and the top vessel was mounted on the resultant. The overlapping portion of the edges of the top vessel and of the bottom vessel after the sealing, the value t, was 0.20 mm.

A reflow test was conducted in the same manner as in Example 1. Charge and discharge operation between 0 V and 3.0 V at 5 mA was carried out by using a charge-discharge measuring system HJ-101SM6 manufactured by HOKUTO DENKO Co. An electrostatic capacitance per mass (F/g) and an electrostatic capacitance per volume ($F/cm^3$) of activated carbon of both electrodes in an electric double-layered capacitor were determined from a discharge property curve obtained in the 2nd constant current discharge operation.

Moreover, charge-discharge cycle test of 200 cycles was carried out for durability evaluation to be made from a retention rate of the electric capacitance (calculated as quotient of an electric capacitance value after 200 charge-discharge cycles divided by an electric capacitance after 2nd charge-discharge cycle).

Example 4

Production of 3.8 mmΦ×1.1 mm Coin-Type Cell (Electrode Diameter of Φ2.1)

To 85 parts by mass of activated carbon having average particle size of 4 μm (BET specific surface area: 1,890 $m^2/g$, the peak A value showing the maximum pore volume in the range of 1 to 1.5 nm: 0.033 $cm^3/g$, which corresponds to 32% of the total pore volume), 7 parts by mass of PTFE (polytetrafluoroethylene) and 8 parts by mass of carbon black were added and kneaded. The resultant was press-rolled at a pressure of 2 ton/$cm^2$ to be formed into a sheet having thickness of 350 μm. Electrode density of the sheet was 0.68 g/$cm^3$. This sheet was punched with a punch into circular sheets each having diameter of 2.1 mmΦ, and each was vacuum-dried at 200° C. around the clock to thereby obtain polarizable electrodes. The sheet produced as in same manner as in Example 1 was punched with a punch into circular sheets each having diameter of 2.1 mmφ. This sheet was vacuum-dried at 200° C. around the clock to thereby obtain polarizable electrodes. In a glove compartment in which high purity argon was circulated, the electrode sheets were adhered to a stainless-steel-made top vessel and to a stainless-steel-made bottom vessel respectively by using a conductive adhesive (rubber-based binder: Bunnylite U.C.C, manufactured by NIPPON KOKUEN KOGYO K.K.) and drying at 100° C. for 20 minutes. 1 μl of electrolytic solution (corresponding to 0.8% of the void volume in the electrode) was injected into the electrode sheet in the top vessel and in the bottom vessel, and the electrodes were kept under normal pressure for one hour to thereby be impregnated with the electrolytic solution. As the electrolytic solution, an electrolytic solution manufactured by TOMIYAMA PURE CHEMICAL INDUSTRIES. Inc. containing PC/SL/EMC (propylene carbonate/sulfolane/ethylmethyl/carbonate) as solvent and 1.5 mol/L of $(CH_3)(C_2H_5)_3NBF_4$ as electrolyte was used.

The top vessel and the bottom vessel were caulked and sealed, after providing 450G (polyether ether ketone) manufactured by Victrex plc. injection-molded as a gasket, a TB1171 manufactured by ThreeBond Co., Ltd. as a sealing agent, and a TGP-010A (glass fiber) manufactured by Nippon Sheet Glass Company, Limited as a separator on the electrode. The overlapping portion of the edges of the top vessel and of the bottom vessel after the sealing, the value t, was 0.15 mm.

A reflow test was conducted in the same manner as in Example 1. Charge and discharge operation between 0 V and 3.0 V at 5 mA was carried out by using a charge-discharge measuring system HJ-101SM6 manufactured by HOKUTO DENKO Co. An electrostatic capacitance per mass (F/g) and an electrostatic capacitance per volume ($F/cm^3$) of activated carbon of both electrodes in an electric double-layered capacitor were determined from a discharge property curve obtained in the 2nd constant current discharge operation.

Comparative Example 1

Production of Coin-Type Cell (6.8 mm(×1.4 mm)

A cell was produced in the same manner as in Example 1 except that: 40 μL of an electrolytic solution (corresponding to 1.9% of the void volume in the electrode) was injected into the electrode sheets in the top vessel and in the bottom vessel produced in the same manner as in Example 1; and the overlapping portion of the edges of the top vessel and of the bottom vessel after the sealing, the value t, was 0.05 mm.

Comparative Example 2

Production of Coin-Type Cell (6.8 mmΦ×1.4 mm)

A cell was produced in the same manner as in Example 1 except that: 2 μL of an electrolytic solution (corresponding to 0.09% of the void volume in the electrode) was injected into the electrode sheets in the top vessel and in the bottom vessel produced in the same manner as in Example 1; and the overlapping portion of the edges of the top vessel and of the bottom vessel after the sealing, the value t, was 0.12 mm.

Table 1 collectively shows the results of Examples 1 to 4, and Comparative Examples 1 and 2. In each of the Examples, 30 units of cells were prepared, 614-type in Example 1 and Comparative Examples 1 and 2, 414-type in Example 2, 311-type in Example 3, and coin-type in Example 4. Each cell was evaluated on changes in liquid leakage, capacitance and in internal resistance to compare the values before and after reflow at 260° C. for 10 seconds, and on cycle characteristics after the reflow test, assuming that each of the values before the reflow test was 100%.

TABLE 1

|  | Overlap t (mm) | Amount of electrolytic solution with respect to electrode pores (ratio %) | Liquid leakage after reflow (in 30 cells) | Capacity after reflow as compared to that before reflow | Internal resistance after reflow as compared to that before reflow | Cycle characteristics after reflow |
|---|---|---|---|---|---|---|
| Example 1 | 0.12 | 3.9 | 0 | 101% | 99% | 97% |
| Example 2 | 0.30 | 11.8 | 0 | 100% | 101% | 96% |
| Example 3 | 0.20 | 20.3 | 0 | 99% | 102% | 95% |
| Example 4 | 0.15 | 0.8 | 0 | 98% | 110% | 94% |
| Comparative Example 1 | 0.05 | 39.4 | 13 | 80% | 140% | — |
| Comparative Example 2 | 0.12 | 0.8 | 0 | 96% | 105% | 70% |

Example 5

[Conductive Adhesive]

An acrylamide crosslinked polymer of cellulose (the thermal decomposition starting temperature measured by TG-DTA was 275° C.) as a compound having ion permeability and acetylene black (having a primary particle size of 40 nm) as carbon fine particles were used to produce a mixed paste. Water was used as a solvent, and the ion permeable compound, acetylene black, and water were mixed with one another at a mass ratio of 40:40:20.

[Coin-Type Cell Assembly]

To 80 parts by mass of activated carbon having average particle size of 4 μm (BET specific surface area: 1,510/g, the peak A value showing the maximum pore volume in the range of 1 to 1.5 nm: 0.022 cm$^3$/g, which corresponds to 24% of the total pore volume), 10 parts by mass of PTFE (polytetrafluoroethylene) having an average particle size of 500 μm and 10 parts by mass of carbon black were added and kneaded, and the resultant was press-rolled at a pressure of 1 ton/cm$^2$ into a sheet having thickness of 420 μm. Electrode density of the sheet was 0.62 g/cm$^3$. This sheet was punched with a punch into circular sheets each having diameter of 4.0 mmΦ, and adhered with the conductive adhesive onto an aluminum-made top vessel and an aluminum-made bottom vessel respectively, and was vacuum-dried at 200° C. around the clock.

Further, in a glove compartment in which high purity argon was circulated, electrolytic solution was injected into the electrode in the top vessel and the bottom vessel. As the electrolytic solution, an electrolytic solution manufactured by TOMIYAMA PURE CHEMICAL INDUSTRIES. Inc. containing PC (propylene carbonate) as solvent and 1 mol/L of $(CH_3)(C_2H_5)_3NBF_4$, $(C_2H_5)_4NBF_4$ as electrolyte was used.

The top vessel and the bottom vessel were caulked and sealed, by using A Fortlon KPS (polyphenylene sulfide) manufactured by KUREHA CORPORATION as a gasket, a TB1171 manufactured by ThreeBond Co., Ltd. as a sealing agent, and a TGP-010A (glass fiber) manufactured by Nippon Sheet Glass Company, Limited as a separator on the electrode.

Charge and discharge operation between 0 V and 2.5 V at 5 mA was carried out by charge-discharge measuring system HJ-101SM6 manufactured by HOKUTO DENKO Co. An electrostatic capacitance per mass (F/g) and an electrostatic capacitance per volume (F/cm$^3$) of activated carbon of both electrodes in an electric double-layered capacitor were determined from discharge property curve obtained in the 2nd constant current discharge operation.

Moreover, charge-discharge cycle test of 200 cycles was carried out for durability evaluation to be made from a retention rate of the electric capacitance (calculated as quotient of an electric capacitance value after 200 charge-discharge cycles divided by an electric capacitance after 2nd charge-discharge cycle).

Example 6

A coin-type electric double-layered capacitor was produced in the same manner as in Example 5 except that 1% by mass of carboxymethylcellulose (CMC) was further added to the acrylamide crosslinked polymer of cellulose.

Comparative Example 3

A coin-type electric double-layered capacitor was produced in the same manner as in Example 5 except that a Bunnyhite T-803 (manufactured by Nippon Graphite Industries, ltd.) and an acrylic binder (the thermal decomposition temperature was 200° C.) were each used as a conductive adhesive, and that water in which fine particles of graphite and carbon black had been dispersed was used.

30 units of the above coin-type electric double-layered capacitor were prepared, and were each evaluated for reflow characteristic from change in its internal resistance after are flow test at 260° C. for 10 seconds as compared to that before the reflow test. Table 2 shows the results.

TABLE 2

|  | Impedance (Ω) 1 KHz | Electric capacitance (F/cell) | Reflow characteristic (rate of change in internal resistance) |
|---|---|---|---|
| Example 5 | 11 | 0.18 | Good (100%) |
| Example 6 | 12 | 0.19 | Good (99%) |
| Comparative Example 3 | 19 | 0.18 | Bad (130%) |

INDUSTRIAL APPLICABILITY

The electric double-layered capacitor of the present invention can be applied to various types of power supply system. The power supply system can be used in a power supply system for vehicles such as automobiles and trains; a power supply system for ships; a power supply system for aircrafts; a power supply system for mobile electronic equipment such as mobile phones, portable digital assistants, and portable electronic calculators; a power supply system for business equipment; a power supply system for a power generation system such as solar battery power generation system, and wind power generation system; communication device; electronic tag; and the like.

The invention claimed is:

1. A coin-type electric double-layered capacitor, including activated carbon electrode layers, an electrolytic solution, and a separator between a top vessel (1) and a bottom vessel (2), and obtained by caulking and sealing the top vessel (1) and the bottom vessel (2) with a gasket (3) and a sealing agent, wherein the edges of the top vessel (1) and of the bottom vessel (2) after the caulking overlap each other by 0.15 to 0.5 mm.

2. The coin-type electric double-layered capacitor according to claim 1, in which a conductive adhesive layer is present between the top vessel (1) or the bottom vessel (2) and each of the activated carbon electrode layers, and the conductive adhesive layer contains a compound having ion permeability, and carbon fine particles.

3. The electric double-layered capacitor according to claim 1, in which the content of the electrolytic solution with respect to an electrode pore volume is 0.1 to 10%.

4. The electrical double-layered capacitor according to claim 1, in which the gasket (3) is at least one kind of resin selected from a polyphenylene sulfide resin, a polyether ketone resin, a polyether etherketone resin, a polyethylene terephthalate resin, a polyarylate resin, a polybutylene terephthalate resin, a polycyclohexane dimethylene terephthalate resin, a polyether sulfone resin, a polyamino bismaleimide resin, a polyamideimide resin, a polyether imide resin, and a polyamide 46 resin.

5. The electric double-layered capacitor according to claim 1, in which the sealing agent contains a polymer having one of a linear polyisobutylene structure and a linear perfluoropolyether structure as a main chain in its molecules, and further contains a hindered phenol-based antioxidant.

6. The electric double-layered capacitor according to claim 1, wherein the activated carbon electrode layers each contain activated carbon having a peak A showing the maximum pore volume value of a pore size range of 1 to 1.5 nm in a pore size distribution, within the range of 0.012 to 0.05 cm$^3$/g, the value accounting for 2 to 32% of the total pore volume.

7. The electric double-layered capacitor according to claim 1, in which the separator is formed of a non-woven fabric, cellulosic paper, a glass fiber, a fluororesin, or polypropylene, and has a thickness of 0.02 to 0.1 mm.

8. A coin-type electric double-layered capacitor according to claim 1, wherein the activated carbon electrode layers, the electrolytic solution, and the separator are present in a metal can, the top vessel and the bottom vessel respectively define top and bottom surfaces of the metal can, the gasket seals the metal can, and a conductive adhesive layer is present between the metal can and each of the activated carbon electrode layers, and the conductive adhesive layer contains a compound having ion permeability and carbon fine particles.

9. The coin-type electric double-layered capacitor according to claim 8, in which the decomposition starting temperature of the compound having ion permeability is 260 ° C. or higher.

10. The coin-type electric double-layered capacitor according to claim 8, in which the compound having ion permeability is a compound obtained by crosslinking polysaccharide polymers, and the carbon fine particles are needle-like or rod-like carbon fine particles.

11. The coin-type electric double-layered capacitor according to claim 8, in which the compound having ion permeability is a compound obtained by crosslinking polysaccharide polymers with one or more kinds selected from the group consisting of acrylamide, acrylonitrile, a chitosan pyrrolidone carboxylate, and hydroxypropylchitosan.

12. The coin-type electric double-layered capacitor according to claim 8, in which the compound having ion permeability has a fluorine ion conductivity of $1 \times 10^{-2}$ S/cm or more.

13. The coin-type electric double-layered capacitor according to claim 8, in which the activated carbon electrode layers each contain activated carbon having a peak A showing the maximum pore volume of a pore size range of 1 to 1.5 nm in a pore size distribution, within the range of 0.012 to 0.05 cm$^3$/g, the value accounting for 2 to 32% of the total pore volume.

14. The coin-type electric double-layered capacitor according to claim 1, in which the activated carbon electrode layers each contain polyethylene terephthalate (PTFE) having an average particle size of 400 to 600 μm.

15. The coin-type electric double-layered capacitor according to claim 1, in which the activated carbon electrode layers each contain one or more kinds selected from the group consisting of carboxymethylcellulose, polyvinylidene fluoride, and polyvinyl acetamide.

16. A portable apparatus using the coin-type electric double-layered capacitor according to claim 1.

* * * * *